(12) United States Patent
Czajkowski et al.

(10) Patent No.: US 7,840,967 B1
(45) Date of Patent: Nov. 23, 2010

(54) SHARING DATA AMONG ISOLATED APPLICATIONS

(75) Inventors: Grzegorz Czajkowski, Mountain View, CA (US); Laurent Daynes, Saint-Ismier (FR); Michal Wegiel, Cracow (PL)

(73) Assignee: Oracle America, Inc., Redwood City, CA (US)

( * ) Notice: Subject to any disclaimer, the term of this patent is extended or adjusted under 35 U.S.C. 154(b) by 1174 days.

(21) Appl. No.: 11/482,603

(22) Filed: Jul. 6, 2006

(51) Int. Cl.
G06F 13/00 (2006.01)

(52) U.S. Cl. .................. 719/312; 719/331; 719/332; 717/166; 718/104

(58) Field of Classification Search ............... 719/312, 719/331, 332; 718/104; 717/166
See application file for complete search history.

(56) References Cited

U.S. PATENT DOCUMENTS 6,851,111 B2 * 2/2005 McGuire et al. ............ 717/166
7,587,721 B2 * 9/2009 Schmidt et al. ............. 719/319

OTHER PUBLICATIONS

Back, Godmar et al., "Processes in KaffeOS: Isoloation, Resolution Management, and Sharing in Java," School of Computing, University of Utah; 14 pages.
"New I/O APIs," Sun Microsystems, Inc., 2002; retrieved on Sep. 13, 2006, 2 pages.

* cited by examiner

Primary Examiner—Andy Ho
(74) Attorney, Agent, or Firm—Osha • Liang LLP

(57) ABSTRACT

A technique for allowing isolated JAVA applications ("isolates") to share data between themselves is disclosed. According to one aspect, a shared object region, to which multiple isolates may attach, is defined in memory. A shared class loader associated with the region is stored in the region in conjunction with the region's creation. Isolates that can access the region can invoke that loader. The region only comprises objects whose type is defined by a bootstrap class loader or the region's associated shared class loader. Runtime representations of classes defined by the shared class loader are stored in the region. Thus, the types of objects stored in the region are known to all isolates that attach to the region. Isolates attached to the region may enter the context of the region to access objects stored therein. Within the context of a shared object region, all allocation instructions automatically allocate to that region.

18 Claims, 3 Drawing Sheets

SHARING DATA AMONG ISOLATED APPLICATIONS

BACKGROUND

Although implementations of shared memory segment across programs have been around for decades and the technology to support it is now well-established, transposing this idea to modern type-safe programming language with dynamic class loading, multiple user-defined name space and automated memory management, such as the Java programming language (JAVA), is difficult.

JAVA is a strongly typed object-oriented programming language. As such, JAVA enforces safety mechanisms that prevent type-incompatible operations from being performed on data. Specifically, the JAVA runtime environment does not allow an application to perform an operation on an object that is not defined by the type of the object. In JAVA, class types are created dynamically, at program execution. A class type is defined via a class loader. The class loader locates and provides, on-demand, the Java Virtual Machine (JVM) with a class file that contains the binary representation of classes, out of which the JVM creates runtime class types. A class type is identified by both (a) the fully qualified name of the class, and (b) the class loader that is associated with that class. Current specifications of the JVM define three platform-defined class loaders organized in a delegation hierarchy: a class loader in the hierarchy always delegates a request for loading a class to its parent first, and only tries to locate a class file itself if the parent failed to find one. The root of the class loader hierarchy is the bootstrap class loader (also called the primordial loader).

The bootstrap class loader is a built-in class loader used to load the base classes that are intimately associated with a JVM implementation and are essential to its functioning (such as classes of the java.lang. *packages). Every program has a bootstrap loader. The bootstrap loader always retrieves the binary representation of classes from the same location (rt. jar, in the case of Sun's HotSpot implementation of the JVM). Further, the bootstrap loader never delegates the resolution of symbolic references. Thus, symbolic references from classes defined by the bootstrap loader always resolve to the same binary representations (which for a given installation of the Java Platform never change), and therefore, to the same runtime representations.

In addition to the three platform-defined class loaders (bootstrap, extension, and system class loaders), each program may create additional class loaders and define their behavior. In general, there is no guarantee that two non-bootstrap class loaders can resolve the same class name to the same class runtime representation for a given class name.

Applications written in JAVA can be executed as "isolates." Isolates are abstract run-time constructs that represent applications (programs) that execute independently from each other. Each isolate has its own private memory area which that isolate, and no other application, can access. For each isolate, the JAVA runtime environment prevents applications other than that isolate from accessing that isolate's data. Isolates run independently of each other.

The features of the Java programming language make sharing across applications difficult and require more than the ability to allocate objects in a memory area shared between isolated applications. Theoretically, a first isolate might be designed to create an object in a designated memory area that is shareable between isolates. The class type of the object would be defined by a class loader created by the first isolate, therefore both the class loader and the runtime representation of the class type would reside in a memory area private to the first isolate, and the first isolate would be able to understand and use the object stored in the designated memory area. Unfortunately, even if a second isolate could obtain a reference to the object that was stored in the designated memory area, the second isolate would not be able to use the object without first understanding the object's type. The second isolate would be unable to understand the object's type without accessing the object's type runtime representation or invoking the class loader that defined the object's type if symbolic links are unresolved. Because both of these are located in memory areas private to the first isolate (in particular, its heap), the second isolate cannot use the object created by the first one.

Even if the second isolate were somehow permitted to access the first isolate's private memory area where the object type representation is stored, the second isolate would be unable to do so unless the first isolate was still executing at the time that the second isolate needed to access the object in the designated memory area. If the first isolate were to create the object in the designated memory area and then terminate, leaving the object in the designated memory area, other applications would have no means of understanding that object's type after the first isolate's termination. When an application terminates, the class loaders privately defined by that application vanish. The inability of any application to use an object created by another application except while that other application is still executing would be intolerably restrictive in most cases.

SUMMARY

Techniques disclosed herein enable isolates to share objects of customized types between themselves. Techniques disclosed herein do not require the isolates that created such objects to be executing concurrently with isolates that need to access those objects. According to one technique, a shared object region, to which multiple isolates may attach, is defined in memory. A shared class loader associated with the shared object region is stored in the shared object region upon creation of the region; further, the runtime representation of classes defined by the shared class loader are stored in the shared object region; thus, all isolates that can access the shared object region can understand the class type of the objects that resides in the region, and can invoke the shared class loader to resolve symbolic references.

Only objects whose type is defined by the shared class loader associated with a shared object region, or objects whose type is defined by a bootstrap class loader, can be stored in the shared object region. This way, the class type of the objects is visible to all isolates that attach to the shared object region.

DETAILED DESCRIPTION OF EMBODIMENT(S)

Overview

Figure 1:
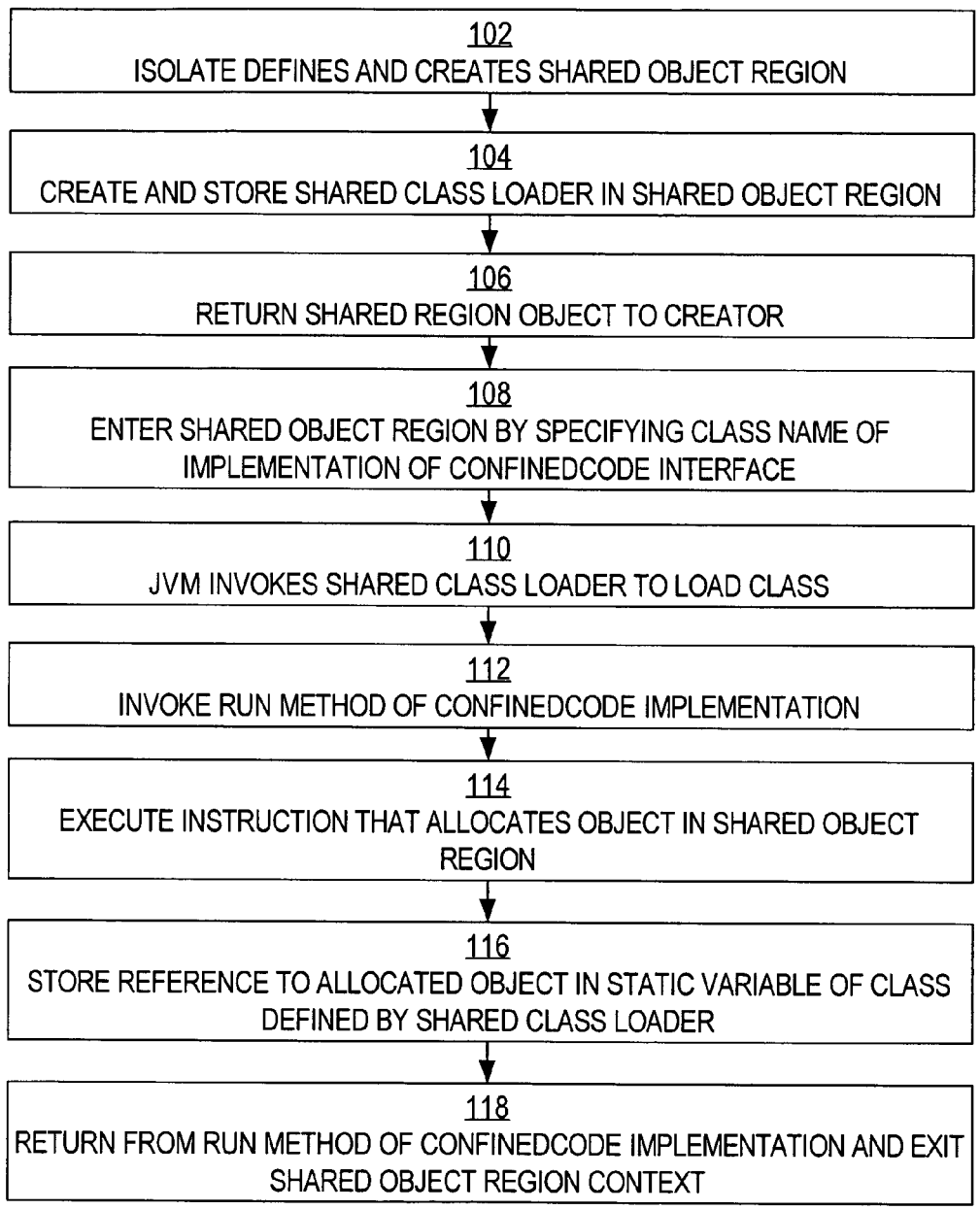
FIG. 1 is a flow diagram that illustrates an example of using a technique for creating a shared object region and populating it with some objects, according to an embodiment of the invention.

According to a technique described herein, some time after an isolate begins executing, the isolate may create, in memory, one or more shared object regions that are separate from that isolate's private memory space. Additionally or alternatively, an isolate may attach to one or more shared object regions that other isolates already have created. The shared object regions to which a particular isolate attaches do not need to have been created as of the time that the particular isolate begins execution.

Although other implementations may vary, in one implementation, each shared object region is associated with a unique name. An isolate may attempt to attach to a shared object region using the associated name. If the attempt is successful, then a region object that represents the shared object region may be returned to the isolate. The region object is typically stored in the shared object region to facilitate synchronization across isolates. In some implementations, the region object may be the shared class loader object. By interacting with the returned region object, the isolate may perform administrative operations on the shared object region and may gain access to objects stored in the shared object region. The isolate may then interact with these objects using the same syntactical conventions that the isolate uses to interact with objects that are stored in the isolate's own private memory space, and may allocate new objects to the shared object region. The shared object region might not persist beyond the time that isolates are using the shared object region. According to one implementation, when an isolate creates a shared object region, the isolate attaches to that shared object region. An attachment count is associated with each shared object region. When an isolate attaches to a shared object region, the region's attachment count is incremented. When an isolate detaches from a shared object region, the region's attachment count is decremented. When a shared object region's attachment count drops below one, the resources allocated to that shared object region may be reclaimed and re-used for other purposes. Isolates can attach to and detach from a shared object region as needed any time while that shared object region remains available in memory (i.e., has a attachment count greater than 0).

According to one embodiment of the invention, when a shared object region is created, a shared class loader specifically for that shared object region is allocated in that shared object region. All resolutions of class types referenced by objects that are stored in a shared object region are handled by the shared class loader that is stored in that shared object region. The shared class loader associated with a shared object region is capable of locating, loading and providing type definitions for classes referenced from objects that are stored in that shared object region. The runtime representation of class types that have been already defined by the shared class loader are stored in the shared object regions. In particular, the first class representation of classes defined by the shared class loaders, as well as their method bytecodes, are stored in the shared object region. There may be several shared object regions, and each shared object region contains a separate associated shared class loader.

Isolates that attach to a shared object region are able to access the shared class loader stored in that shared object region. When a class referenced from an object of the shared object region needs to be resolved, the virtual machine can query the shared class loader associated with that region in order to obtain the appropriate type definition, which the shared class loader provides to the virtual machine.

The Bootstrap Class Loader

Objects that are stored in a shared object region may be instances of classes whose type definitions are defined by (a) the bootstrap class loader or (b) the shared class loader associated with that shared object. The bootstrap class loader is a built-in class loader used to load the base classes that are intimately associated with a JVM implementation and are essential to its functioning (such as classes of the java.lang.*packages, which comprise, among others, the Object, Thread, Class and ClassLoader classes). Every program has a bootstrap loader. The bootstrap loader always retrieves the binary representation of classes from the same location (rt.jar, in the case of Sun's HotSpot implementation of the JVM). Further, the bootstrap loader never delegates the resolution of symbolic references to other class loaders. Thus, symbolic references from classes defined by the bootstrap loader always resolve to the same binary representations (which for a given installation of the Java Platform never change), and therefore, to the same runtime representations for every program. The bootstrap class loader has no first class representation; therefore, programs cannot directly interact with it. When the virtual machine starts, the virtual machine first creates the bootstrap class loader, which the virtual machine uses to load, create, and/or define the type definitions for the "boot classes" required to start a program. The bootstrap class loader exhibits the same behavior relative to all applications. Thus, the bootstrap class loader provides an aspect of determinism regarding class definitions. If a class "A" is defined by the bootstrap class loader, and class "A" refers to a class "B," then class "B" will always be resolved identically in all applications (that is, it will always be defined from the same class file), and "B"'s defining class loader will always be the bootstrap class loader. Due to the nature of the Java programming language, not all class types upon which the objects stored in a shared object region depend are defined by the shared class loader of the shared region. This is because all objects depend, directly or indirectly, on class types defined by the bootstrap class loader, such as the Object class, the Class class, or the ClassLoader class. In particular, classes in the Java programming language support single implementation inheritance, in which the implementation of each class is derived from that of a single superclass, and ultimately from the class Object, defined by the bootstrap loader. Because of this, all shared object regions depend on class types defined by the bootstrap loader. Similarly, in order to be able to define any class type, a class loader should delegate, either directly or transitively through some delegation chain, to the bootstrap class loader. Shared class loaders do not escape this rule, and according to one embodiment of the invention, when an application attaches to a shared object region (of which there may be many), the shared class loader for that shared object region forms a delegation relationship with the bootstrap class loader. The shared class loader follows the default delegation model where the shared class loader always delegates first a request to the shared class loader's parent (the bootstrap class loader) and attempt to define the class only if the parent fails to do so. Multiple isolates may attach simultaneously to the same shared object regions. This may cause a problem, as each isolate has its own bootstrap class loader. Under such circumstances, a determination needs to be made as to which of these bootstrap class loaders the shared class loader should delegate its requests.

Further, a determination needs to be made as to where the runtime representation for the classes defined by a bootstrap class loader should be stored.

According to one embodiment of the invention, because the bootstrap class loader exhibits the same behavior relative to all applications, when a shared class loader delegates, to the bootstrap class loader of any of the isolates to which the shared class loader is attached, a request that involves a boot class, the shared class loader will always be provided the same type definition for that boot class. Thus, a shared class loader may, in principle, delegate to any bootstrap class loader of any of the isolates to which that shared class loader is attached. However, when a shared object region is made dependent on a new class type, the new class type must be made visible atomically to all isolates attached to the shared object region. Further, whereas the runtime representation of classes defined by the shared class loader are stored in the shared region, the runtime representation of classes defined by a bootstrap loader remain stored in the private memory area of the isolate that owns this bootstrap loader. This is necessary, because the bootstrap loader of an isolate and the class defined by that bootstrap loader exist independently of the shared object regions attached to that isolate. A class defined by the bootstrap loader may be loaded by an isolate before that isolate attaches to a shared object region; inversely, a class defined by the bootstrap loader of an isolate while this one was attached to a shared region may still be used by the isolate after the isolate detaches from the shared object region. For all of the above, when a shared class loader delegates a request to the bootstrap class loader, the shared class loader must make sure that the bootstrap class loaders of all isolates attached to the shared object region define the requested class type. As an optimization, a delegation from a shared class loader works as follows: first, the shared class loader delegates the request to the bootstrap class loader of the isolate that initiated the class loading request. If the bootstrap class loader successfully defines the type, then the shared class loader delegates the request to the bootstrap class loaders of all other isolates the shared object region is attached to so that they all define the class type. The delegations of the second wave are guaranteed to succeed since bootstrap class loaders behave identically with respect to class resolution and definitions. If the first delegated request fails, then the shared class loader may attempt to resolve and define the requested class itself.

According to one embodiment of the invention, there is no "first class" object that represents the bootstrap class loader (although there may be first class objects that represent each other class loader, including shared class loaders). Thus, no runtime representation of the bootstrap class loader needs to be created. If this were not the case, then each application would need to have its own separate bootstrap class loader. The omission of a first class object that represents the bootstrap class loader therefore greatly simplifies techniques for sharing objects between isolates.

Static Variables

In the Java programming language, a class' definition can declare a variable within that class as being either an "instance" variable or a "static" variable (variables are also referred to as "fields"). Each object that is an instance of a particular class may assign a different value to the instance variables of the particular class; each such object reads from and writes to a separate, independent "copy" of each instance variable. In contrast, each object that is an instance of a particular class reads from and writes to the same "copy" of a static variable of the particular class; all such objects share the same static variable. Thus, if an object that is an instance of a particular class assigns a particular value to a static variable of the particular class, then the particular value will become the static variable's value visible to all objects that are instances of the particular class. The scope of a static variable is defined by a class, while the scope of an instance variable is defined by an object.

According to one embodiment of the invention, if a class is defined by a shared class loader, then that class' static variables are visible to all applications that attach to the shared object region that is associated with that shared class loader. However, boot classes usually will have been defined before an application attaches to a shared object region and may be used by the application after the application detaches from the shared object region. These boot classes might also contain static variables. Before a first isolate attaches to a shared object region, the first isolate might manipulate a static variable of a boot class. A second isolate might also define the same boot class and manipulate the static variable of the boot class before attaching to the shared object region. Each of the isolates has its own copy of the runtime representation of the boot class and of the boot class' static variable. After the two isolates have attached to the shared object region, it is possible that the first isolate creates, in the shared object region, an instance of the boot class. Intuitively, when the first isolate accesses a static variable of the boot class from within the scope of a method of the instance stored in the shared object region, the first isolate will access the copy of the static variable in the first isolate's private memory. The second isolate might then attempt to access the static variable of the boot class from within the scope of a method of the instance stored in the shared object region. The question then becomes whether an isolate should access the isolate's copy of the static variable of a boot class, or whether the isolate should access the copy of the isolate that created the instance in the shared region. According to one embodiment of the invention, the first option (i.e., an isolate accesses its copy of the static variable of a boot class) is the most meaningful one, for two reasons: (a) it would be difficult for an isolate to access the copy of a static variable located in the private memory of another isolate and would make the first isolate dependent on the first one; and (b) by accessing its own copy of the static variable, the isolate is independent of other isolates that may attach to and create objects in the shared object region.

Therefore, according to one embodiment of the invention, whenever a class is defined by a bootstrap class loader (such as boot classes), the version of that class' static variables that an isolate reads from and writes to is a version that exists in that isolate's private memory area. Classes defined directly by the shared class loader have only one incarnation of the static variable, which is stored in the shared object region (along with the class runtime representation). Thus, whenever a class is defined by a shared class loader, isolates attached to the shared object region manipulate the unique incarnation of that class' static variables stored in the shared class loader's associated shared object region.

Performing Operations in the Shared Object Region Context

As is discussed above, in one embodiment of the invention, an isolate may attempt to attach to a shared object region using a name or other identifier associated with the shared object region. If the attempt is successful, then a region object that represents the shared object region may be returned to the isolate. By interacting with the returned region object, the isolate may gain access to objects stored in the shared object region and may interact with these objects using the same syntactical conventions that the isolate uses to interact with objects that are stored in the isolate's own private memory space.

When an isolate attaches to one or more shared object regions, the isolate may allocate objects into each of these shared object regions in addition to the heap that is private to the isolate. By default, the isolate allocates from the isolate's heap. In order to allocate objects directly into a shared object region, the isolate must enter the context of the shared object region. However, only objects whose types are defined by either the bootstrap class loader or the shared class loader associated with the shared object region can be stored (and therefore, allocated) in the shared object region. In order to enforce this, entering the context of a shared object region is performed by invoking a method of the shared region object representing the shared object region with the name of an implementation of the ConfineCode interface and arguments to the run method of that interface, as illustrated in the following example:

public interface ConfineCode {
    public Object run(Object . . . args);
}
public class ConfineCodeImpl implements ConfineCode {
    public Object run(Object . . . args);
    . . .
}
R.execute ("AConfineCodeImpl", arg1, . . . );

The name of the ConfineCode implementation provided to the execution method must be that of a class that the shared class loader of the shared object region can define; otherwise a ClassNotFoundExcept ion may be thrown.

When entering the context of a shared object region, the JVM arranges for the current thread to perform allocations directly in the shared object region. That is, all instructions new, newarray and anewarray executed while in the context of a shared object region allocate storage in the shared object region.

When entering in the context of a shared object region using the execute method, the current thread also enters the context of the shared class loader of the shared object region.

Running in the context of a class loader means that the JVM will forward all requests to resolve symbolic references to classes to that class loader.

Each thread of execution within a program keeps track of a current class loader that defines the thread's current class loader context. The current class loader is simply the class loader that defines the class of the method being executed. A thread enters the context of a class loader C by invoking a method of a class defined by the class loader C. Upon returning from the method invocation, the thread returns to its previous class loader context (i.e., the class loader that defines the class of the method into which the thread returns).

In order to enter the context of a class loader freshly created, a thread must first obtain the reference to a class and invoke one of the class' method by reflection (possibly creating a first instance of the class by reflection first if the invoked method isn't static). For example:

//Create an instance of the RunnableImpl classes that implements the Runnable
//interface (a core interface defined by the bootstrap loader).
Runnable r=(Runnable)
loader.loadClass("RunnableImpl", true).newInstance( );
//Invoke the run method defined by Runnable
r.run( ); //the current threads enter in "loader" context for
    //the duration of the run method execution.

The execute method of the shared region object associated with the shared object region performs similar operations to create an instance of the ConfinedCode implementation specified as the first argument of the execute method.

Isolates may enter the context of the shared class loader of a shared object region without explicitly entering the context of the shared object region. For example, if the execute method returns a non-null reference to an object of the shared object region defined by the region's shared class loader, then the thread may enter the context of the shared class loader simply by invoking a method on the returned object. In this case, however, allocations that may occur during the execution of that method take place in the isolate's heap since the thread executing the method is not in the context of the shared object region.

Example Flow

FIG. 1 is a flow diagram that illustrates an example of using a technique for creating a shared object region and populating it with some objects, according to an embodiment of the invention. Objects allocated in the shared object region can become visible to all isolates that attach to the shared object region by making allocated object reachable from a static variable of a class defined by the shared class loader of the shared object region.

In block 102, an isolate defines and creates a shared object region in memory. The shared object region may be associated with a specified identifier that other isolates may use to refer to and attach to the shared object region.

In block 104, a shared class loader for the shared object region is automatically created and stored in the shared object region. Thus, the shared class loader is visible and accessible to all isolates that attach to the shared object region. The shared class loader may be automatically created and stored by the virtual machine in response to the definition and creation of the shared object region.

In block 106, a shared region object is returned to the creator. The isolate obtains a reference to a shared region object in response to the creation of the shared object region.

In block 108, the isolate enters the context of the shared object region by invoking the execute method of the shared region object with the name of a class that implements the ConfinedCode interface. The implementation of the ConfinedCode interface may include code that creates new objects.

In block 110, the shared class loader of the shared object region attempts to obtain a reference to the class that implements the ConfinedCode interface and whose name was specified in argument to the execute method. This results in the JVM invoking the shared class loader to obtain the class type for this class name. The class loader delegates first to the bootstrap loader of the isolate, which may not be able to resolve the name into a class type. In this case, the shared class loader provides the definition of the class type for the specified implementation of ConfinedCode.

In block 112, the shared region object creates an instance of the ConfinedCode implementation specified in argument to the execute method and invokes, via reflection, the run method of that instance.

In block 114, the run method may execute an instruction that allocates an object (e.g., new, newarray, anewarray). Because the instruction is executed in the context of the shared object region, the object is allocated to the shared object region.

In block 116, the run method may store the reference of the object allocated in the shared object region in a static variable of a class defined by the shared class loader. The object becomes thus visible to other isolates attached to the shared object region.

In block 118, execution returns from the execute method of the shared region object, and as a result, exits from the context of the shared object region. Subsequent execution of allocation instructions (new, anewarray, newarray) will allocate objects from the default heap. Execution returns from the execute method of the shared region object, and as a result, exits from the context of the shared object region.

Figure 3:
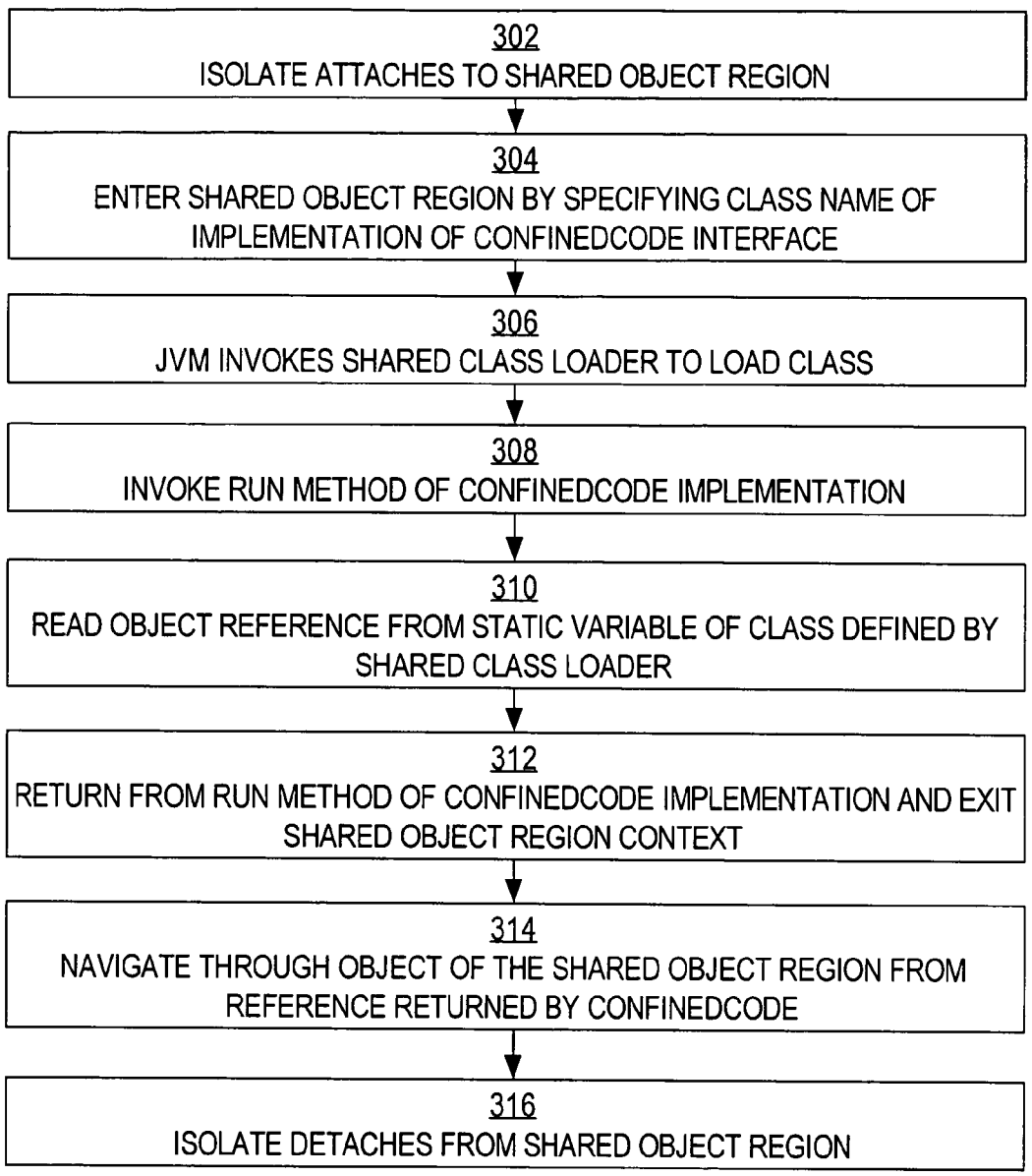
FIG. 3 is a flow diagram that illustrates an example of using a technique for attaching to a shared object region and accessing objects that are stored in it, according to an embodiment of the invention.

FIG. 3 is a flow diagram that illustrates an example of using a technique for attaching to a shared object region and accessing objects that are stored in it, according to an embodiment of the invention.

In block 302, an isolate attaches to a shared object region associated with some identifier, and obtains a reference to the shared region object in response to the successful attachment.

In block 304, the isolate enters the context of the shared object region by invoking the execute method of the shared region object with the name of a class that implements the ConfinedCode interface.

In block 306, the shared class loader of the shared object region attempts to obtain a reference to the class that implements the ConfinedCode interface and whose name was specified in argument to the execute method. This results in the JVM invoking the shared class loader to obtain the class type for this class name. The class loader delegates first to the bootstrap loader of the isolate, which may not be able to resolve the name into a class type. In this case, the shared class loader provides the definition of the class type for the specified implementation of ConfinedCode.

In block 308, the shared region object creates an instance of the ConfinedCode implementation specified in argument to the execute method and invokes, via reflection, the run method of that instance.

In block 310, the run method may read an object reference from a static variable of a class defined by the shared class loader of the shared object region and return that object reference.

In block 312, execution returns from the execute method of the shared region object with the object reference read from the static variable, and as a result, exits from the context of the shared object region.

In block 314, the isolate may now navigate through objects of the shared object region, starting from the object returned by the execute method of the shared region object. This traversal of the shared objects is performed while outside of the shared object region. Thus, any allocation performed during the traversal will result in allocation to the heap of the isolate.

In block 316, the isolate detaches from the shared object region.

Hardware Overview

Figure 2:
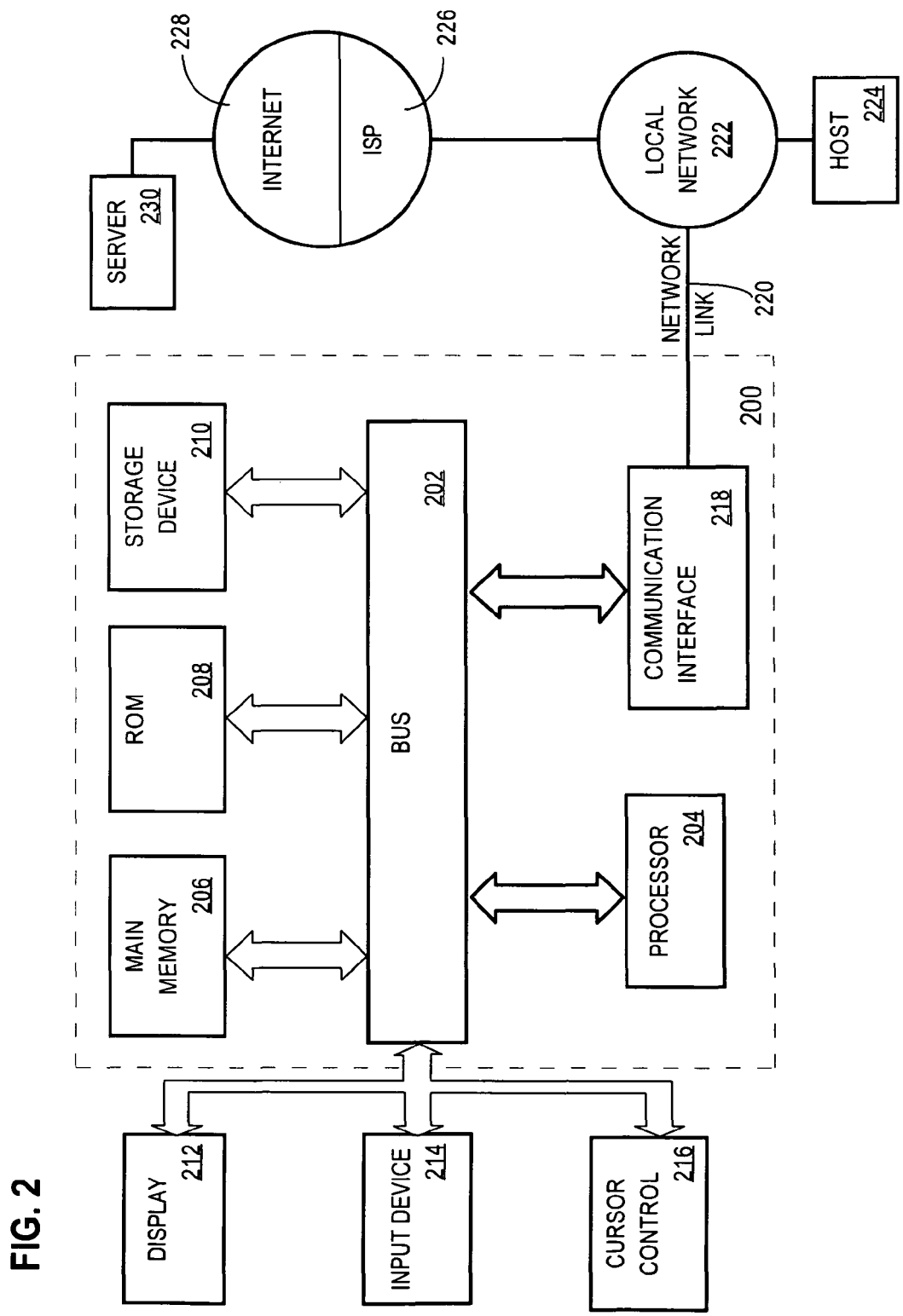
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium that carries wireless signals between one or more of the components. Bus 202 may also be a medium that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as an electromagnetic wave. Further, processor 204 may communicate with ROM 208 capacitively. In this instance, the bus 202 would be the medium that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

Processor 204 may execute the received code as the code is received and/or stored in storage device 210 or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for sharing objects of a strongly typed object oriented programming language with dynamic class loading, the method comprising:
   creating a shared memory region and associating the shared memory region with an identifier;
   storing a shared class loader in the shared memory region upon creation of the shared memory region;
   storing a shared region object in the shared memory region to represent the shared memory region and perform operations on the shared region object;
   attaching to the shared memory region to obtain a reference to the shared region object of the shared memory region;
   entering a context of the shared memory region to allocate one or more objects in the shared memory region;
   entering the context of the shared memory region to obtain references to one or more objects stored in the shared memory region; and
   detaching from the shared memory region to enable reclaiming of resources of the shared memory object.

2. The method of claim 1, wherein entering the context of the shared memory region comprises:
   invoking a method of the shared region object with the name of a class implementing a specified interface, the method of the shared region object comprising instructions to attempt loading the class using the shared class loader of the shared memory region; and
   if the shared class loader succeeds, then creating an instance of the class, changing an allocation context of a current thread of execution to the shared memory region, invoking an implementation of the specified interface, and returning to an original allocation context upon returning from an invocation of the implementation of the specified interface.

3. The method of claim 2, further comprising:
executing in a context of the shared memory region; and
allocating memory to the shared memory region upon execution of instructions for allocating objects.

4. The method of claim 2, further comprising:
loading a class using the shared class loader;
delegating class loading to a bootstrap class loader of an isolate that is requesting class loading;
if the bootstrap class loader fails to load one or more classes, then locating a binary representation of a particular class, defining a class type from the representation, and storing a runtime representation of the particular class in the shared memory area; and
if the bootstrap class loader has loaded the particular class, then requesting the bootstrap class loaders of all isolates attached to the shared memory area to load the particular class.

5. The method of claim 1, further comprising:
accessing a static variable of a particular class from a method of an object stored in the shared object region;
determining whether the particular class is defined by the shared class loader;
if the particular class is defined by the shared class loader, then accessing a shared copy of the static variable, which is stored in the shared object region;
if the particular class is defined by a bootstrap loader, then accessing a copy of the static variable, which is stored in a private memory area of an isolate that is performing the accessing.

6. The method of claim 1, wherein the shared region object includes an attachment count, and wherein the method further comprises:
increasing the attachment count when an isolate successfully attaches to the shared memory region;
decreasing the attachment count when an attached isolate detaches from the shared memory region; and
when the attachment count returns to zero, preventing isolates from attaching to the shared memory region and enabling reclaiming of resources of the shared memory region.

7. A machine-implemented method for sharing data between applications, the method comprising:
defining a shared object region in memory;
storing a shared class loader in the shared object region;
detecting a first application's attempt to store an object in the shared object region;
in response to detecting the first application's attempt to store the object, storing the object in the shared object region;
detecting a second application's attempt to access the object in the shared object region; and
in response to detecting the second application's attempt, invoking the shared class loader to provide the second application with a type definition for the object.

8. The method of claim 7, further comprising:
detecting an attempt, by the first application, to create the shared object region;
wherein the step of defining the shared object region is performed in response to the first application's attempt to create the shared object region;
detecting an attempt, by the second application, to attach to the shared object region after the shared object region has been defined; and
in response to detecting the attempt by the second application to attach to the shared object region, providing the second application with a region object through which the second application can access objects that are stored in the shared object region.

9. The method of claim 7, wherein a bootstrap class loader sends a request to the shared class loader when the bootstrap class loader cannot locate a type definition in a specified class path.

10. The method of claim 9, wherein no first class object provides a runtime representation of the bootstrap class loader.

11. The method of claim 7, further comprising:
detecting an attempt, by the first application, to access a static variable of a particular object that is stored in the shared object region;
in response to detecting the first application's attempt to access the static variable, determining whether a particular class, of which the particular object is an instance, is defined by a bootstrap class loader;
if the particular class is defined by the bootstrap class loader, then causing the first application to access a version of the static variable that is only available to the first application; and
if the particular class is not defined by the bootstrap class loader, then causing the first application to access a version of the static variable that is available to both the first application and the second application.

12. The method of claim 7, further comprising:
detecting an invocation of a method of a region object that represents the shared object region, and
in response to the invocation of the method of the region object, performing, in a context of the shared class loader, an operation on an instance of a class named in a parameter of the invocation.

13. A non-transitory machine-readable medium storing a plurality of instructions comprising functionality to:
define a shared object region in memory;
store a shared class loader in the shared object region;
detect a first application's attempt to store an object in the shared object region;
store, in response to detecting the first application's attempt to store the object, the object in the shared object region;
detect a second application's attempt to access the object in the shared object region; and
invoke, in response to detecting the second application's attempt, the shared class loader to provide the second application with a type definition for the object.

14. The non-transitory machine-readable medium of claim 13, wherein the plurality of instructions further comprise functionality to:
detect an attempt, by the first application, to create the shared object region, wherein the step of defining the shared object region is performed in response to the first application's attempt to create the shared object region;
detect an attempt, by the second application, to attach to the shared object region after the shared object region has been defined; and
provide, in response to detecting the attempt by the second application to attach to the shared object region, the second application with a region object through which the second application can access objects that are stored in the shared object region.

15. The non-transitory machine-readable medium of claim 13, wherein a bootstrap class loader sends a request to the shared class loader when the bootstrap class loader cannot locate a type definition in a specified class path.

16. The non-transitory machine-readable medium of claim 15, wherein no first class object provides a runtime representation of the bootstrap class loader.

17. The non-transitory machine-readable medium of claim 13, wherein the plurality of instructions further comprise functionality to:
- detect an attempt, by the first application, to access a static variable of a particular object that is stored in the shared object region;
- determine, in response to detecting the first application's attempt to access the static variable, whether a particular class of which the particular object is an instance is defined by a bootstrap class loader;
- if the particular class is defined by the bootstrap class loader, then cause the first application to access a version of the static variable that is only available to the first application; and
- if the particular class is not defined by the bootstrap class loader, then cause the first application to access a version of the static variable that is available to both the first application and the second application.

18. The non-transitory machine-readable medium of claim 13, wherein the plurality of instructions further comprise functionality to:
- detect an invocation of a method of a region object that represents the shared object region; and
- perform, in response to the invocation of the method of the region object and in a context of the shared class loader, an operation on an instance of a class named in a parameter of the invocation.

* * * * *